Aug. 14, 1951 F. M. DARNER 2,564,396
SEAM WELDING PROCEDURE FOR PIPE MANUFACTURE
Filed Nov. 1, 1949 2 Sheets-Sheet 1
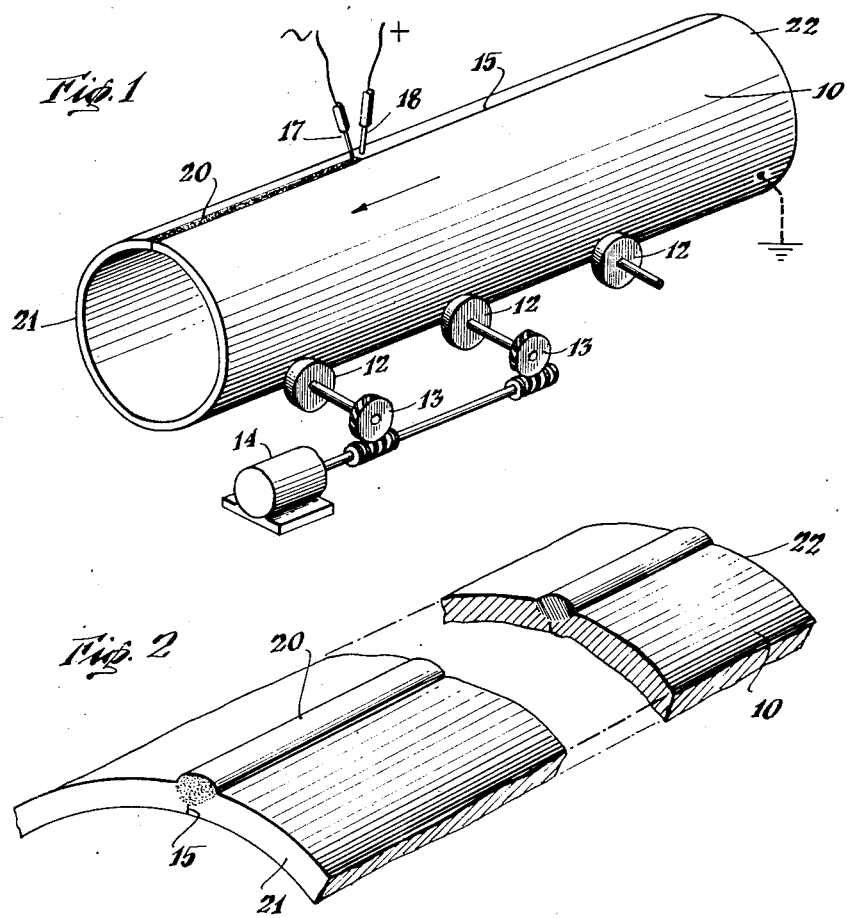
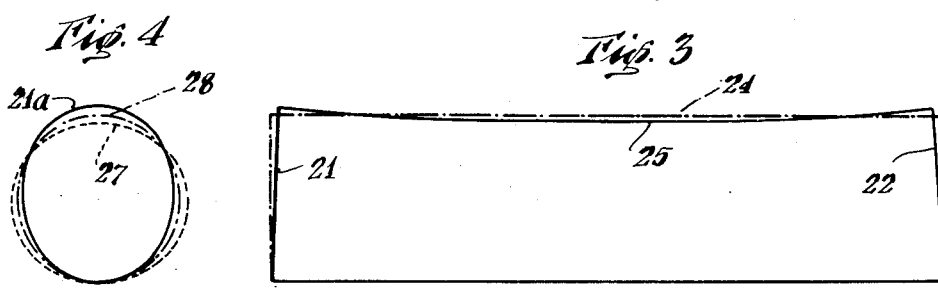
INVENTOR.
Frederic M. Darner
BY
Robert S. Dunham
ATTORNEY Aug. 14, 1951  F. M. DARNER  2,564,396
SEAM WELDING PROCEDURE FOR PIPE MANUFACTURE
Filed Nov. 1, 1949  2 Sheets-Sheet 2
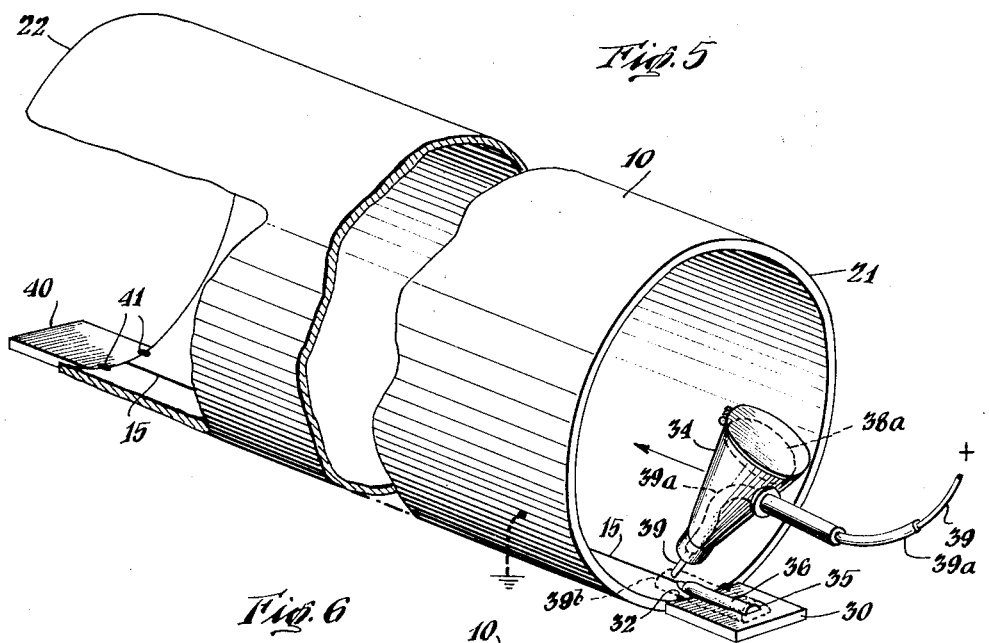
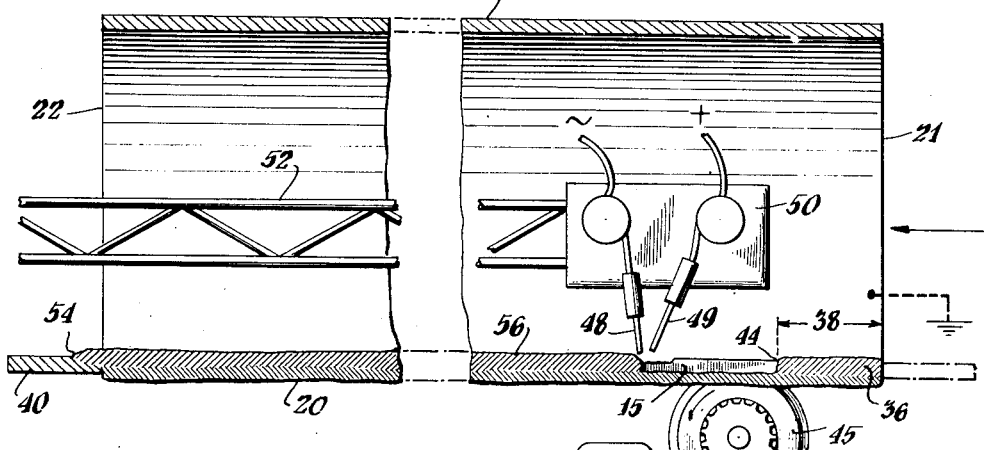
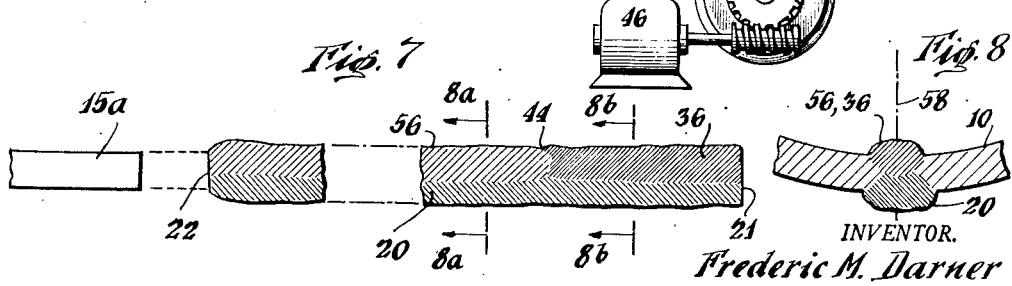
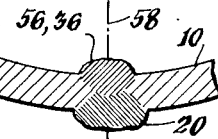
INVENTOR.
Frederic M. Darner
BY
Robert S. Dunham
ATTORNEY Patented Aug. 14, 1951

2,564,396

UNITED STATES PATENT OFFICE 2,564,396

SEAM WELDING PROCEDURE FOR PIPE MANUFACTURE

Frederic M. Darner, Shaker Heights, Ohio, assignor to Republic Steel Corporation, Cleveland, Ohio, a corporation of New Jersey Application November 1, 1949, Serial No. 124,928

10 Claims. (Cl. 219—10)

This invention relates to seam welding procedure for the manufacture of pipe, and more particularly to methods of joining the longitudinal cleft in a tubular pipe blank having such a cleft, so as to produce finished pipe with a strong and effectively closed seam. The invention is peculiarly designed for the manufacture of so-called large diameter pipe, for example cylindrical steel tube having a diameter from about 6" (inches) to 36" and having a relatively heavy wall. By way of more specific example, the novel procedure set forth below has been found highly effective in making steel pipe with an inside diameter of 24" to 30" or so, and of heavy gauge, e. g. of the order of 1/4" to 3/8" in wall thickness.

In the manufacture of such pipe, the heavy sheet or plate stock, called skelp, is first formed, as by rolling, into a suitable cylindrical configuration so that the long outer edges of the skelp are brought together to constitute a cleft extending longitudinally of the pipe blank. Such blank, for example, may be of the order of 30 feet long, more or less, and may have a diameter of the value indicated above and a wall thickness of say, 1/8" to 1/2". To complete the pipe the cleft must be joined, as by electrical arc welding operation, so that an essentially integral, tubular metal structure results.

It has been found desirable to secure the seam by welding successively on opposite sides of the pipe wall. That is to say, by suitable electric arc means, a weld is produced along the cleft first on one side of the pipe blank and thereafter along the same cleft on the other side of the blank; the first weld penetrates substantially through the pipe wall at the cleft line, while the second weld penetrates toward and preferably into the first, from the other side. For example, in one effective type of apparatus, the pipe blank is moved longitudinally with the cleft uppermost and its edges closed together. As the blank passes the stationary arc welding instrumentalities, the weld is produced along the upper surface from one end to the other. Thereafter, in another apparatus, the blank is similarly advanced in an axial direction, but with the cleft at the bottom. Stationary arc welding means supported within the blank have been there employed to produce the inside weld on the passing inner surface, with the view of completing the bond along the cleft.

In successive welding operations of the nature just described, cracks, breakage or other imperfections frequently developed in the seam at one end, specifically the end at which the second of the operations was terminated. For instance, the first stage afforded a thoroughly satisfactory weld, e. g. along the outside of the blanks, but upon completing the inside operation, this inside weld was often found to break or crack at the end where it terminated. This problem seems peculiarly acute where the inside weld is performed by using a plurality of simultaneously operating arcs in a closely spaced tandem array (such arcs having a strong heating effect); in certain specific aspects, the invention is therefore directed to procedure wherein the major part of the inside weld is effected by such plural-arc type of operation.

An important object of the present invention is to provide improved methods of joining a longitudinal cleft in a pipe blank, and to yield a securely welded closure on both sides, with no cracks or imperfections in the latter of the two welds. A further object is to afford novel and simple welding procedure of the character stated, to produce, along the cleft of a large diameter pipe blank, an essentially perfect joint free from cracks or structural weakness. Still further objects are to afford improved methods of the nature described, which involve an efficient and economical series of welding operations that can be performed without special skill and indeed with entirely conventional equipment, and which fully obviate all difficulties of the character explained above.

The nature of the invention, as well as certain principles which have been found to underlie the above mentioned difficulties in pipe welding and to which the present improvements are related, may best be explained by reference to the accompanying drawings. The latter illustrate certain relationships of shape and stress occurring in a pipe blank during various operations, and also illustrate, by way of example, an effective series of steps in accordance with the invention. It will be understood that all welding, pipe-advancing and other devices incidental to the described operations are merely indicated in a simplified diagrammatic way in the present drawings, such apparatus being no part of the invention and being susceptible of embodiment in various suitable forms.

Referring to the drawings:

Fig. 1 is a diagrammatic perspective view showing a pipe blank in the course of a cleft-welding operation along its outer surface;

Fig. 2 is an enlarged fragmentary view of the upper part of the pipe blank in Fig. 1 after the outside weld has been completed;

Figs. 3 and 4 are diagrams representing the outside-welded pipe blank in elevation respectively from the side and the end, to show certain relations of shape which may be involved in the welding steps;

Fig. 5 is a diagrammatic perspective view of the pipe blank showing a preliminary inside welding step in accordance with the invention;

Fig. 6 is a longitudinal, vertical section showing a further welding operation to complete the inside weld;

Fig. 7 is an enlarged radial, longitudinal section of the wall of the finished pipe taken along the cleft line; and Fig. 8 is a transverse, fragmentary section of the pipe wall taken along either of the lines 8a—8a or 8b—8b of Fig. 7.

Since the nature of the invention can best be explained by some further consideration of the undesirable results obtained in previous pipe-welding practice, reference is first made to Fig. 1 showing the performance of outside welding, which may be the same in both the previous and the presently improved methods. Here a large diameter heavy gauge pipe blank 10, for example having an inside diameter of 24 to 30 inches and a wall thickness ¼ to ⅜ of an inch, is advanced axially, as in the direction of the arrow, by suitable means here simply indicated by the rollers 12, drive gearing 13, and a motor drive unit 14. The pipe blank has a longitudinal cleft 15, which is held uppermost so that it advances in its own straight line past the welding apparatus comprising, for instance, the welding arc electrodes 17, 18.

It will be understood that the pipe advancing equipment may include a considerable multiplicity of guiding and driving rollers or the like, which not only provide the necessary advancing force (instead of the simple rollers 12 here shown) but also hold the cleft edges firmly closed in precise alignment and registration for the welding operation, such apparatus being omitted from the drawings for simplicity. It will also be appreciated that the arc welding instrumentalities may be of various types, including one or a plurality of electrodes, and may include the usual rod-feeding and control means, similarly omitted for clarity. By way of example here, two arc welding electrodes 17, 18 are shown in a longitudinal array, energizing respectively by alternating and direct current. Such welding apparatus, wherein arc are maintained between the electrodes and the work, also preferably includes provision for depositing a heavy layer of fine granular flux (not shown) along the weld path, so that the arcs are submerged in the flux, for a peculiarly effective type of operation.

It will therefore be appreciated that as the pipe blank 10 advances, a weld 20 is produced on and beneath the outside surface along the cleft from the leading end 21 to the rear end 22 of the blank. Fig. 2 shows the resulting structure, wherein the weld 20 constitutes an integrally bonded bead of weld material which not only somewhat protrudes from the pipe surface but penetrates downwardly at the vicinity of the cleft to a considerable extent, indeed preferably through more than half the thickness of the wall. The under portion of the cleft nevertheless remains unwelded, so that the joint must be finished by the inside operation.

As explained above, it was found that upon welding the inside continuously from one end to the other of the pipe blank 10, a damaging strain on the solidifying weld metal often occurred at the finishing end of the inside operation. It has now further been discovered that the strain appears to arise by a reversal or relief of previously established stress. During the outside welding and especially upon the cooling and contraction of the completed outside weld, the latter is placed under strong longitudinal tension. Referring to Fig. 3 and assuming that the straight horizontal dotted line 24 represents the position that the uppermost surface or cleft line might otherwise occupy, the severe longitudinal tension produced by the solidifying and shrinkage of the outside weld causes the pipe surface to bend or bow into a slightly concave configuration as represented by the solid line 25. While this and other shapes shown in Figs. 3 and 4 have been greatly exaggerated for clarity, the stated longitudinal distortion in an outwardly concave manner has been found to occur in fact; although its actual magnitude is very slight, it correspondingly causes each end 21 and 22 of the blank to have a vertically oval shape as represented at 21a in Fig. 4.

It was found that upon completion of a like continuous welding operation throughout the inside of the pipe blank, the end where such operation terminated, for instance the end 21, tended to assume a horizontally oval shape as represented at 27 in Fig. 4 and as also distinguished from a true circle 28. It appears that at such end locality the heating effect of the inside welding arc, taken with the heated condition in which it has just left a considerable length of the cleft region, served to reverse or relieve the longitudinal tension or stresses which had been set up by the outside weld. The described change of shape thus occurring at the end of the pipe (and remaining or increasing as the inside weld cooled), from the vertical oval 21a to the horizontal oval 27, and shown in exaggerated dimensions in Fig. 4, was accompanied by severe, and essentially unopposed, transverse strain across the solidifying inside weld metal at the end region, frequently sufficient to produce cracks or breaks in or along the weld metal, running back from the end edge (or running back from a locality very near the end edge). Even if the pipe did not have to be scrapped, it required a separate, cumbersome and perhaps even dubiously effective repair or patching operation.

While some localized reversal of the longitudinal tension or stress undoubtedly occurs at each point of the inside welding operation, no difficulty of the sort explained was found in the earlier stages of that operation. At the beginning of the inside weld and throughout the length of the major portion of the pipe, the cold portion of the outside weld and adjacent metal maintains the rigidity of the pipe near its initial vertical oval shape long enough to allow the inside weld metal to solidify and cool sufficiently so that it (the inside weld) is of adequate strength to counteract the relieved or reversed strain. That is to say, during the outset, the heating effect is presumably insufficient and the tension relief or reversal thus only relatively minor, so that the rigidity maintained by adjacent portions of the outside weld is effective to prevent any dangerous change of shape. Similarly throughout the central part of the inside weld path, the general rigidity of the structure, especially at the cooler ends, prevents any adverse effect. However, as the inside operation approached its terminal point at the remote end of the pipe blank, there was no metal ahead of the weld to hold the pipe sufficiently and long enough for the inside weld to cool to an extent adequate for resisting the relief of stress. Consequently, the rapid change of shape caused the end portion to crack. In other words, with a considerable portion of the outside weld (behind the point of inside welding operation) in a heated and unstressed or less stressed condition, and especially with little or no cold metal ahead of the weld point, the final heating up to and at the very end of the pipe was found to occasion the cracking or other damage mentioned above, either at once or upon subsequent cooling of the inside weld.

Accordingly, it has been discovered that these difficulties may be overcome in an essentially simple but very effective way. Stated briefly, the complete pipe-making operation of the invention involves first welding the cleft along one side of the blank, e. g. progressively from one end to the other, and then effecting the weld on the other side in a plurality of operations. More specifically, the last mentioned operations (whether or not each is achieved continuously or in successive sub-stages) may be defined as two welding steps, covering respectively, two linear portions which complementarily make up the entire extent of the cleft on the second-treated side of the pipe wall. Thus the first step may be to weld a part of the cleft from one end of the pipe to a selected point; then upon performing the second step by welding from the other end to the same point, a complete and satisfactory joint is obtained without any impairment of the weld previously made on the other side. It will be appreciated that the first of these two steps should be completed and its weld solidified and at least somewhat cooled before the second is initiated or at least before such second welding step approaches the common point.

A particular feature of the invention is that one of the steps may extend nearly the entire length of the pipe and may thus be performed by conventional automatic equipment for continuous welding along a moving pipe, while the other step need cover only a correspondingly minor distance, e. g. less than one foot, and can thus be accomplished economically by a simple hand-held or other readily manipulated device. While a short welding step of the sort just mentioned can in most cases be achieved by running the weld either toward or away from the pipe end which it intersects, it appears peculiarly desirable that any long welding run (constituting one step in the series making up the second-welded side) be started at or near one end of the pipe and progress in the direction of the other end, i. e. if it is not simply a continuation of another long run which may have progressed from an end to the middle of the pipe. It is likewise believed undesirable, as will be apparent from the explanation hereinabove, to have any long welding run (e. g. equal to several diameters or more in a large diameter pipe) proceed entirely to the pipe-end toward which it progresses; a spaced should be left, occupied by another weld separately made either before or after the long run.

It will be understood that in a broad sense the problem is the same whether the pipe blank is first welded on the outside and then on the inside, or whether the inside weld is made first, i. e. in that the described breakage or cracking is apt to occur upon the completion of continuous operation on the second side, whichever it may be. In consequence the plural nature of the second operation in accordance with the present invention may thus in fact characterize either the inside weld or the outside weld, i. e. whichever is selected to be second. While the new method is thus applicable to a variety of conditions and while the special, plural operation on one face (be it inside or outside) may be accomplished with its component steps in either order, it will suffice to described in detail a single but preferred example of the invention involving a procedural sequence that is especially convenient in practical respects.

Referring thus to Fig. 5, it will be assumed that the pipe blank 10 has had its cleft 15 welded along the outside as represented in Figs. 1 and 2, and that the blank has been rotated on its axis so that the cleft is now at the bottom. At one end of the blank, which may be either but is here illustrated as the end 21, a small plate or tab 30, having a thickness corresponding to that of the pipe wall, is mounted edgewise against the end of the pipe wall in bridging relation to the cleft. The tab 30 can be temporarily tack-welded in place as indicated at 32. Then by appropriate means, such as a hand-held arc welding device 34, a relatively short weld is made along the inside line of the cleft, for example, starting at a locality 35 on the aligned face of the tab and running inward of the pipe for a short distance from the end 21. While Fig. 5 shows the weld 36 only partially completed, its finished length 38 is illustrated in Fig. 6 and may be selected according to the circumstances, e. g. from 4 to 5 inches upwards. In large diameter pipe of the character specifically mentioned above, a length of about 6 to 8 inches (i. e. the distance 38 from the end 21) was found satisfactory for this first weld or ligament 36. It will be understood that the tab 30 may be cut or broken off after the completion of the weld 36, its purpose being simply to facilitate starting the weld and to insure its effectiveness from the very edge 21 of the pipe.

As an example of various suitable devices, the hand unit 34 comprises a cone-shaped hopper holding a supply of granular flux 38a, the welding wire 39 being advanced through the hopper (by suitable, remote means, not shown) within conduit structure 39a while the flux also flows out of the hopper to be deposited as at 39b for submerged operation of the arc.

In accordance with prior practice in continuous seam-welding, a tab 40 of like size and shape to the tab 30 may be tack-welded at 41, 41, in edgewise relationship to the other end 22 of the blank and in bridging relation to the cleft 15. The tab 40 serves to permit an effective flying start, so to speak, for the subsequent welding operation along the unwelded part of the cleft.

Following these operations, the blank is then subjected to the second run of the inside welding procedure, viz., from the other end 22 to the point 44 at which the weld 36 terminates. Thus, as shown in Fig. 6, the pipe 15 is advanced endwise in the direction of the arrow by suitable roller means or the like (indicated, for simplicity, by a single one of such rollers 45 and a motor drive 46 geared thereto) so that the inside line of the cleft travels longitudinally past suitable welding means such as the arc electrodes 48 and 49 carried with their control and feeding apparatus diagrammatically indicated at 50, on the end of a boom 52 that projects into the pipe. Although single-electrode or other arc welding instrumentalities may be employed, a convenient and particularly important example is a two-electrode array of the same character as shown in Fig. 1.

In the operation shown in Fig. 6 welding is commenced at a suitable point 54 on the starting tab 40 and progresses along the cleft on the inside surface as the pipe is moved past the boom-carried electrodes. This final weld 56 is thus extended to the point 44, thereby completing the inside welding of the cleft. When the weld portion 36 is of about a minimum length for prevention of damage, care should be taken to terminate the weld 56 at the point 44, i. e. so that it does not run appreciably into the weld portion 36; but if the weld 36 is long enough, the weld 56 may overlap it, providing the long weld is not carried closer than a suitable minimum distance, say 1" to 3", from the end 21 of the pipe. The tab 40 may now be cut or broken off, as was the tab 30 before the start of the operation in Fig. 6.

The cleft line of the pipe is now completely welded on both sides, as indicated in Fig. 7, the outside weld 20 extending continuously from one end to the other of the blank and the inside weld being constituted by the short section 36 and the subsequently completed, long section 56. The inside weld preferably penetrates the pipe wall at the cleft line in a manner similar to that of the outside weld and indeed thus remelting and somewhat penetrating the inner-most extremity of the latter. These relationships are further illustrated in Fig. 8, where the line originally occupied by the cleft is indicated in dot and dash at 58. For comparative reference, Fig. 7 also includes a diagrammatic representation at 15a of the pipe wall as it appeared adjacent the cleft before either welding operation. Experience indicates that although they should be entirely solidified and somewhat cooled, both the outside weld 20 and the ligament weld 36 may (without detriment) still be hot, e. g. at several hundred degrees F. or so, when the long inside weld 56 is made.

By the described procedure, including the two-stage welding operation on the second side, the difficulties occasioned by reversal of stress at the end of the pipe are entirely obviated; the above-described change in shape (e. g. from vertical to horizontal oval) eventually occurs in both ends of the pipe to a considerable degree, but not until after the inside weld has solidified and has slightly cooled. The preliminary weld 36 (which in fact constitutes the finished weld throughout its extent) not only serves as a further ligament to hold the end of the pipe more rigidly during the later weld 56, but is particularly significant in that it forms a complementary part of the inside weld at and near the end 21 of the pipe without itself causing any damaging effects at such locality, for the same reason (explained above) that such effects are absent from any starting end of an inside welding operation. That is to say, the remainder of the outside-welded cleft line is essentially cold and rigid while the weld 36 is made. Like permanence of structure and avoidance of change are exhibited as the inside weld 56 is separately started from the opposite end of the pipe. Since a similar rigidity of the pipe as held by the outside weld near the end 21 (and preferably as reinforced by the now cold ligament 36) prevents any serious, i. e. crack-forming change of shape there so long as the continuous inside weld stops sufficiently short of the end 21 (i. e. at the point 44), there is no adverse effect even up to the termination of the weld 56. In consequence, by these simple steps an effectively continuous weld has been produced along the entire inside face of the cleft, without any objectionable de-arrangement or disturbance of this inside weld throughout its entire length.

Where the inside weld, as made prior to this invention, ran continuously from end to end, the relief or reversal of the described longitudinal stress caused the latter end to change to a horizontal oval shape (27 in Fig. 4) just as the inside weld was solidifying; this change produced a bending action directly in the welded seam, putting the solidifying metal in tension and frequently cracking it. While the ligament 36 slightly reduces the total change in shape at the end, it especially serves to restrain the weld zone from doing most of the bending. Thus even though the change to horizontal oval shape may occur (as the weld 56 is terminated), the weld region itself does not bend severely as it does when a weld is run continuously to the very end and the inside weld metal is there still molten and the outside weld red hot by conduction. While at some stage in the operation the other end 22 of the pipe also changes to horizontal oval shape, relief of longitudinal stress does not effect such change until after the first portions of the weld 56 have solidified and cooled sufficiently to avoid cracking. It will be understood that after both welds 36 and 56 are completed, the eventual, final cooling of this inside weld causes it to shrink and pull the ends of the pipe to a vertical oval shape again.

In operations such as shown in Figs. 5 and 6, it is found that the minimum length for a short ligament weld 36 varies somewhat with the nature of the steel of which the pipe 10 is made. Thus where the steel of the skelp is in the lower range of carbon and manganese content, e. g. about 0.22% carbon and 0.60% manganese, a ligament as short as one inch is often sufficient to prevent cracking, whereas if the steel is in the higher range, such as about 0.30% carbon and 0.90% manganese, a ligament weld of at least three inches or so may be necessary. To a limited extent the minimum length for this weld portion 36 seems to be inversely proportional to the pipe diameter in the large diameter pipe described above, but may be slightly less for very short lengths of such pipe. It is believed that in general, more reliable or more efficient production is had where the short weld 36 is made before the long weld 56; in following a reverse order of steps, best insurance against cracking is likely to require that the long weld be stopped at a considerably greater distance from the end than the minima mentioned above.

As in the case of the welding operation described for the electrodes 17 and 18 in Fig. 1, the welding device 34 and likewise the electrodes 48 and 49 in Fig. 6 may be operated in the submerged manner, viz. with a heavy layer of flux overlying the weld path.

Where the long inside weld 56 is accomplished with two or more electrodes, as specifically shown, some care may be required to avoid leaving a crater or cavity at the end 44 of their path. Experience has revealed that in multiple arc welding (as distinguished from a single arc), such a crater is apt to occur when the weld is interrupted at an intermediate locality on the work and when the arc energizing and electrode feeding means are all simultaneously interrupted in an ordinary manner. However, in accordance with a procedure described and claimed in the copending application of Watler S. Schaefer, Serial No. 125,192, filed November 3, 1949, now Patent No. 2,527,336, such crater may be avoided by first interrupting the energizing circuit of the leading electrode 49 (as also its feeding device) while delaying any control of the second electrode 48 until it has advanced (i. e. in effect, by the motion of the pipe) to the place where the electrode 49 was at the time of its interruption and where electrode 49 may have left a crater. There the means feeding the second electrode rod 48 toward the work is interrupted but without interrupting the current supply; hence as the crater travels across under the electrode 48, the electrode metal is carried off into the crater (thus filling it), until the arc is extinguished by the elongation of the gap. In this manner the weld 56 is fully completed, at its junction with the weld 36.

It is to be understood that the invention is not limited to the specific procedures herein set forth by way of example, but may be carried out in other ways without departure from its spirit.

I claim:

1. A method of joining a longitudinal cleft in a pipe blank of large diameter by welding along both inside and outside surfaces of the pipe, comprising first welding the cleft on one surface by progressive welding operation between the ends of the blank, and then welding the cleft on the other surface by two welding operations for corresponding adjoining lengths of the cleft, said two welding operations being separated in time sufficient to solidify the adjoining end of the weld of the first before the second approaches welding operation at the adjoining end of its length, one of said welding operations extending between one end of the blank and a point distant therefrom by a small fraction of the length of the blank, and the other of said welding operations extending between the said point and the other end of the blank and being performed by welding progressively along the pipe blank from said other end toward said point.

2. A method of joining a longitudinal cleft in a pipe blank of large diameter by welding along both inside and outside surfaces of the pipe, comprising first welding the cleft on one surface by progressive welding operation between the ends of the blank, and then welding the cleft on the other surface by two welding operations complementarily extending over the length of the blank, one of said operations comprising welding progressively from one end of the blank to a point a short distance from the other end, and the other of said welding operations comprising welding the cleft over said distance, and said two welding operations being mutually timed so that as the first-mentioned of said two welding operations approaches and reaches said point, the region between the point and said other end of the blank is substantially unheated except by said first-mentioned of the two operations, and so that throughout said other of said two welding operations, a major part of the longitudinal extent of the blank reaching from said point toward the first-mentioned end is substantially unheated except by said other of the two operations, said other of the two operations, for welding over said short distance between said other end and said point, comprising holding a metal member against the edge of said other end of the blank in bridging relation to the cleft and with a surface of said member aligned with the surface to be welded, and while so holding said member, progressively welding a line which includes said short distance of the cleft and also extends over an appreciable distance on the surface of the metal member.

3. A method of joining a longitudinal cleft in a pipe blank of large diameter by welding along both inside and outside surfaces of the pipe, comprising first welding the cleft on one surface by progressive welding operation between the ends of the blank, and then welding the cleft on the other surface by two welding operations complementarily extending over the length of the blank, one of said operations comprising welding progressively from one end of the blank to a point a short distance from the other end, and the other of said welding operations comprising welding the cleft over said distance, and said two welding operations being performed in sequence, the second-performed of them being initiated only after the weld produced by the first-performed has solidified.

4. A method of joining a longitudinal cleft in a pipe blank of large diameter by welding along both inside and outside surfaces of the pipe, comprising first welding the cleft on one surface by progressive welding operation between the ends of the blank, and then welding the cleft on the other surface by separate welding operations respectively progressively performed from the opposite ends of the blank toward an intermediate point, said last-mentioned operations being mutually timed so that one of them approaches and reaches said point only after the other has been completed and its weld has solidified, each of said last-mentioned operations comprising holding a metal member against the edge of the end of the blank from which the operation is to start, said member being so held in bridging relation to the cleft and with a surface of said member aligned with the surface to be welded, and while so holding said member, effecting the operation by starting the weld on the surface of the member, running the weld across the boundary between member and blank, and thereafter progressively along the cleft as aforesaid.

5. A method of joining a longitudinal cleft in a pipe blank of large diameter by welding along both inside and outside surfaces of the pipe, comprising first welding the cleft on the outside surface by progressive welding operation between the ends of the blank, and then welding the cleft on the inside surface by two welding operations for corresponding adjoining lengths of the cleft, said two welding operations being separated in time sufficient to solidify the adjoining end of the weld of the first before the second approaches welding operation at the adjoining end of its length, one of said welding operations extending between an end of the blank and a point distant therefrom by less than five per cent of the length of the blank, and the other of said welding operations extending between the said point and the other end of the blank and being performed by welding progressively along the pipe blank from said other end toward said point.

6. A method of joining a longitudinal cleft in a pipe blank of large diameter by welding along both inside and outside surfaces of the pipe, comprising first welding the cleft on the outside surface by progressive welding operation between the ends of the blank, then welding a portion of the cleft on the inside surface between one end and a locality spaced from said end by progressive welding operation between said end and said locality, and thereafter completing the welding of the cleft on the inside surface by welding operation progressively performed from the other end of the blank to said locality.

7. A method of joining a longitudinal cleft in a pipe blank of large diameter by welding along both inside and outside surfaces of the pipe, comprising first welding the cleft on the outside surface by progressively welding operation between the ends of the blank, then welding the cleft on the inside surface by welding operation between one end of the blank and a point distant therefrom by a small fraction of the length of the blank and thereafter completing the welding of the cleft on the inside surface by progressive welding operation from the other end of the blank to said point, said first inside welding operation, between the point and the first end of the blank, comprising holding a metal member against the edge of said first end in bridging relation to the cleft and with a surface of said member aligned with the surface to be welded, and while so holding said member, progressively welding along a line which extends between said first end and the point and which also extends over an appreciable distance on the surface of the metal member, and said second inside welding operation comprising advancing a plurality of electric welding arcs in close tandem relation progressively along the cleft from said other end of the blank to said point.

8. A method of joining a longitudinal cleft in a pipe blank of large diameter by welding along both inside and outside surfaces of the pipe, comprising first welding the cleft on the outside surface by progressively welding operation between the ends of the blank, then welding the cleft on the inside surface by welding operation progressing from one end of the blank to a point distant therefrom by less than five per cent of the length of the blank and thereafter completing the welding of the cleft on the inside surface by progressive welding operation from the other end of the blank to said point, said second inside welding operation comprising advancing a plurality of electric welding arms in close tandem relation progressively along the cleft from said other end of the blank to said point.

9. A method of joining a longitudinal cleft in a pipe blank of large diameter by welding along both inside and outside surfaces of the pipe, comprising first welding the cleft on one surface by progressive welding operation between the ends of the blank, and then welding the cleft on the other surface by separate welding operations respectively progressively performed from the opposite ends of the blank toward an intermediate point, said last-mentioned operations being mutually timed so that one of them approaches and joins the other at said point only after those portions of both of them which respectively adjoin the ends of the pipe have solidified and at least partially cooled.

10. A method of joining a longitudinal cleft in a pipe blank of large diameter by welding along both inside and outside surfaces of the pipe, comprising first welding the cleft on one surface by progressive welding operation between the ends of the blank, and then welding the cleft on the other surface by separate, complementary welding operations, one of said welding operations extending between one end of the blank and a point a short distance from said first end and the other of said welding operations comprising welding progressively from the other end of the blank to said point, said second mentioned operation being timed relative to the first so that it approaches and reaches said point only after the first has solidified and at least partially cooled, said first of the second surface welding operations, between the first end of the blank and said point, comprising holding a metal member against the edge of said first end in bridging relation to the cleft and with a surface of said member aligned with the surface to be welded, and while so holding said member, progressively welding along a line which extends between said first end and the point and which also extends over an appreciable distance on the surface of the metal member.

FREDERIC M. DARNER.

REFERENCES CITED

The following references are of record in the file of this patent:

UNITED STATES PATENTS

| Number | Name | Date |
|---|---|---|
| 1,512,787 | Morton | Oct. 21, 1924 |
| 1,830,783 | Burnish | Nov. 10, 1931 |
| 1,867,375 | Priebe | July 12, 1932 |
| 2,489,002 | Babbitt | Nov. 22, 1949 |

Certificate of Correction

Patent No. 2,564,396

August 14, 1951

FREDERIC M. DARNER

It is hereby certified that error appears in the printed specification of the above numbered patent requiring correction as follows:

Column 3, line 49, for "energizing" read *energized*; line 50, for "arc" read *arcs*; column 5, line 63, for "spaced" read *space*; column 6, line 7, for "described" read *describe*; column 8, line 74, for "Watler S. Schaefer" read *Walter S. Schaefer*; column 9, line 8, after "where" insert *such*; column 11, line 44, for "arms" read *arcs*;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*